(12) United States Patent
Wardle et al.

(10) Patent No.: US 9,827,745 B2
(45) Date of Patent: Nov. 28, 2017

(54) GROOVED POLYMERIC INSULATION FOAM MEMBER AND RELATED METHOD

(71) Applicant: FLORACRAFT CORP., Ludington, MI (US)

(72) Inventors: Trevor Wardle, Ashland, KY (US); Russell Lee Schoenherr, Sarasota, FL (US)

(73) Assignee: FLORACRAFT CORP., Ludington, MI (US)

( * ) Notice: Subject to any disclaimer, the term of this patent is extended or adjusted under 35 U.S.C. 154(b) by 430 days.

(21) Appl. No.: 14/303,961

(22) Filed: Jun. 13, 2014

(65) Prior Publication Data

US 2014/0366980 A1   Dec. 18, 2014

Related U.S. Application Data

(60) Provisional application No. 61/956,613, filed on Jun. 13, 2013.

(51) Int. Cl.

| | |
|---|---|
| *F16L 9/14* | (2006.01) |
| *B32B 27/06* | (2006.01) |
| *B32B 27/40* | (2006.01) |
| *B32B 27/30* | (2006.01) |
| *B32B 1/08* | (2006.01) |
| *F16L 59/02* | (2006.01) |

(52) U.S. Cl.
CPC .............. *B32B 27/065* (2013.01); *B32B 1/08* (2013.01); *B32B 27/304* (2013.01); *B32B 27/306* (2013.01); *B32B 27/40* (2013.01); *F16L 59/022* (2013.01); *B32B 2597/00* (2013.01)

(58) Field of Classification Search
USPC ......................................... 138/149, 141, 151
See application file for complete search history.

(56) References Cited

U.S. PATENT DOCUMENTS

| | | | | |
|---|---|---|---|---|
| 2,576,698 | A | * 11/1951 | Russum | .................. F01B 17/04 |
| | | | | 138/149 |
| 3,117,902 | A | * 1/1964 | Holzhelmer | .......... F16L 59/022 |
| | | | | 138/149 |
| 3,336,951 | A | 8/1967 | Huelster | |
| 3,557,840 | A | * 1/1971 | Maybee | ................ F16L 59/026 |
| | | | | 138/149 |
| 4,009,735 | A | * 3/1977 | Pinsky | .................. F16L 59/022 |
| | | | | 138/147 |
| 4,576,206 | A | 3/1986 | Lauren | |

(Continued)

*Primary Examiner* — James Hook
(74) *Attorney, Agent, or Firm* — Harness, Dickey & Pierce, P.L.C.; Stephen T. Olson

(57) ABSTRACT

An insulated assembly, including a pipe and a substantially rigid insulation board, is provided. The pipe includes a cylindrical outer surface defining a first diameter. The insulation board is disposed around the outer surface of the pipe and includes an inner surface defining a second diameter. The second diameter is substantially equal to the first diameter. The inner surface includes a plurality of grooves. Each of the plurality of grooves includes first and second opposed sidewalls. The insulation board includes a material having a compressive strength and a flexural strength, the compressive strength includes a value between fifteen pounds per square inch and one hundred pounds per square inch, and the flexural strength includes a value between forty pounds per square inch and one hundred pounds per square inch.

19 Claims, 2 Drawing Sheets

(56) References Cited

U.S. PATENT DOCUMENTS

| | | | |
|---|---|---|---|
| 4,699,243 A * | 10/1987 | Enoki | B62J 99/00 |
| | | | 138/151 |
| 4,954,202 A * | 9/1990 | Price | B23D 45/062 |
| | | | 156/220 |
| 5,020,481 A * | 6/1991 | Nelson | F24H 1/182 |
| | | | 122/19.2 |
| 5,310,594 A | 5/1994 | Holland et al. | |
| 5,393,105 A | 2/1995 | Petterson et al. | |
| 5,697,282 A | 12/1997 | Schakel et al. | |
| 5,762,109 A | 6/1998 | Matthews et al. | |
| 5,953,818 A | 9/1999 | Matthews et al. | |
| 6,000,437 A * | 12/1999 | Ponder | F16L 59/026 |
| | | | 138/128 |
| 6,148,867 A | 11/2000 | Matthews et al. | |
| 6,231,927 B1 * | 5/2001 | Ruid | B05D 1/42 |
| | | | 118/123 |
| 6,457,237 B1 | 10/2002 | Matthews et al. | |
| 6,979,484 B2 | 12/2005 | Lewis | |
| 6,986,403 B1 | 1/2006 | Rowland et al. | |
| 7,069,956 B1 * | 7/2006 | Mosier | F16L 11/20 |
| | | | 138/114 |
| 8,142,879 B2 | 3/2012 | Whitaker et al. | |
| 8,568,844 B2 * | 10/2013 | Whitaker | F16L 59/021 |
| | | | 138/149 |
| 2002/0079011 A1 * | 6/2002 | Toth | F16L 59/024 |
| | | | 138/149 |
| 2008/0206543 A1 * | 8/2008 | Whitaker | F16L 59/021 |
| | | | 428/304.4 |
| 2014/0261846 A1 * | 9/2014 | Lanciaux | B29D 23/001 |
| | | | 138/141 |

* cited by examiner

GROOVED POLYMERIC INSULATION FOAM MEMBER AND RELATED METHOD

CROSS-REFERENCE TO RELATED APPLICATIONS

This application claims the benefit of U.S. Provisional Application No. 61/956,645, filed on 14 Jun. 2013. The entire disclosure of the above application is incorporated herein by reference.

FIELD

The present invention generally relates to a grooved polymeric insulation foam member and a related method.

BACKGROUND

This section provides background information related to the present disclosure which is not necessarily prior art.

Pipes and tubes are used for transporting fluids such as gases and liquids in various industrial applications. Often, it is desirable to maintain the temperature of such fluids by insulating an exterior surface of the pipe. For many years, extruded polystyrene (XPS) foam has been used to insulate industrial piping. Because of its physical properties, XPS foam is often used to insulate chilled water systems. In these applications, typically, half shells of XPS foam are machined out of XPS foam billets. These half shells can then be applied to the exterior surface of the piping. This approach tends to create a significant amount of wasted material. Moreover, the production of large billets is limited by current manufacturing capabilities. Thus, the availability of half shells for pipes and vessels having larger diameters is also limited. In these larger diameter applications, smaller circular segments of XPS foam are fabricated from large billets or boards. This practice, too, results in a significant amount of scrap, and is also very costly in terms of the fabrication labor costs and installation costs.

Recent advancements have seen the development of cylindrical XPS foam. The core of the cylinder can be removed creating half shells with much less waste than the billet process described above. However, as with the billet process, the production of large diameter cylinders is limited by current manufacturing capabilities. Thus, the availability of large diameter cylinders for pipes and vessels having larger diameters is, again, limited.

It is also known in the art to fabricate rigid or semi-rigid fibrous glass or mineral wool insulation with slits or grooves that close when the insulation is wrapped around the outside of a pipe or the inside of a duct. However, the insulating and moisture resisting properties of these fibrous glass and mineral wool products is poor. In this regard, at least one external surface of fibrous glass or mineral wool insulation is often faced with a second material to improve the mechanical strength, rigidity, and/or moisture resisting properties of the insulation.

While known foam insulating products and methods have generally proven to be acceptable for their intended purposes, a continued need in the relevant art remains.

SUMMARY

This section provides a general summary of the disclosure, and is not a comprehensive disclosure of its full scope or all of its features.

According to one particular aspect, the present disclosure provides an insulated assembly. The insulated assembly includes a pipe and a substantially rigid insulation board. The pipe includes a cylindrical outer surface defining a first diameter. The insulation board is disposed around the outer surface of the pipe and includes an inner surface defining a second diameter. The second diameter is substantially equal to the first diameter. The inner surface includes a plurality of grooves. Each of the plurality of grooves includes first and second opposed sidewalls. The insulation board includes a material having a compressive strength and a flexural strength, the compressive strength includes a value between fifteen pounds per square inch (15 psi) and one hundred pounds per square inch (100 psi), and the flexural strength includes a value between forty pounds per square inch (40 psi) and one hundred (100 psi) pounds per square inch.

According to another particular aspect, the present disclosure provides a pipe-insulating apparatus. The pipe-insulating apparatus includes a substantially rigid insulation board having a first surface, a second surface opposing the first surface, and plurality of grooves formed in the second surface. The insulation board includes a material selected from a group consisting of polystyrene, polyurethane, polyisocyanurate, polyethylene, polyethylene terephthalate, polypropylene.

According to yet another particular aspect, the present disclosure provides a method of insulating a vessel. The method includes providing a duct having a cylindrical outer surface. The outer surface defines a first diameter. The method also includes providing a substantially rigid insulation board having a first surface and a second surface opposing the first surface. The method further includes forming a plurality of grooves in the second surface of the rigid insulation board. The method also includes wrapping the rigid insulation board around the duct, such that the second surface defines a second diameter substantially equal to the first diameter. The method further includes heating the rigid insulation board such that the second surface maintains the second diameter.

According to yet one more particular aspect, the present disclosure provides an insulation board constructed of a foam material. The insulation board defines a thickness T and includes a plurality of parallel grooves defining a depth D and a distance X therebetween. The depth D is less than or equal to seventy-five percent of the thickness T. The distance X is between one-quarter of an inch and three inches. The insulation board can be bent to contact an outer surface of a cylindrical pipe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
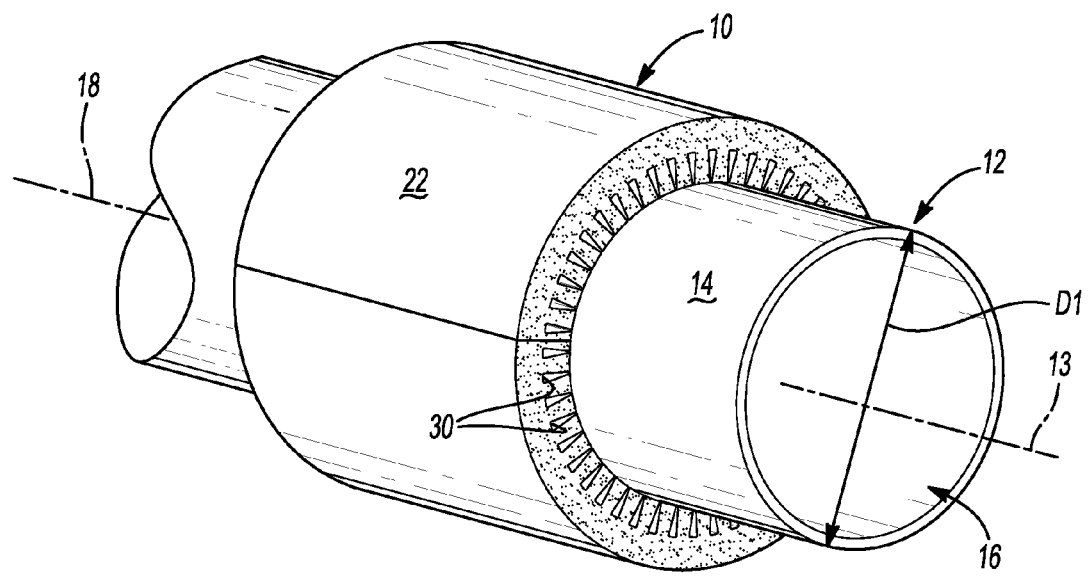
FIG. 1 is a perspective view of a grooved insulation board in accordance with the teachings of the present disclosure, the grooved insulation board shown operatively associated with a pipe.

With initial reference to FIG. 1, a grooved insulation board constructed in accordance with the teachings of the present disclosure is illustrated and identified at reference character 10. The grooved insulation board 10 is shown wrapped around, or otherwise operatively associated with, a tube or pipe 12 that extends along a first axis 13. The pipe 12 may define an outer diameter D1. As will be explained in more detail below, in one configuration the grooved insulation board 10 may be used to insulate, or otherwise surround, an exterior surface 14 of the pipe 12 as the pipe is utilized to transport a fluid 16 having cold or cryogenic temperature requirements. In this regard, it may be desirable to ensure that the insulation board 10 has low water vapor transmission and water absorption characteristics and high thermal resistance characteristics. In this way, the insulation board 10 can resist the absorption, and phase change cycling (e.g., freeze and thaw cycles), of water vapor in the surrounding ambient air which may condense on the exterior surface 14 of the pipe 12 and on the insulation board 10 when the pipe 12 is cooled. It may also be desirable to ensure that the insulation board maintains a high resistance to temperature changes (e.g., freeze and thaw cycles) of the fluid 16 within the pipe 12.

While the grooved insulation board 10 is described and illustrated herein as being wrapped around, or otherwise associated with, a pipe 12, it will be appreciated that the grooved insulation board 10 may be wrapped around, or otherwise associated with other objects having a contoured or arcuate outer surface, such as storage vessels, air ducts, and building walls, within the scope of the present disclosure. It will also be appreciated that the present teachings have application beyond the exemplary use described herein.

The grooved insulation board 10 may be constructed from a foam material having a plurality of closed cells (not specifically shown). The closed cells of the grooved insulation board 10 may have a transverse dimension ranging in size from 0.10 to 0.35 mm. The size of the closed cells can help to improve the insulation value (R) and characteristics of the grooved insulation board 10, while also limiting the amount of flexibility of the grooved insulation board 10. In this regard, the grooved insulation board 10 may be constructed from a foam material having a density between one and three-tenths pounds per cubic foot (1.3 pcf) and three pounds per cubic foot (3.0 pcf), a flexural strength between forty pounds per square inch (40 psi) and one hundred pounds per square inch (100 psi), and a compressive strength between fifteen pounds per square inch (15 psi) and one hundred pounds per square inch (100 psi) at yield. The flexural strength and the compressive strength may be such that the grooved insulation board 10 is substantially rigid, and not readily bent or otherwise deformed. As used herein, the term substantially rigid means that the grooved insulation board 10 cannot be configured from a generally planar shape to a generally arcuate or round shape without a plurality of grooves 30, as will be described in more detail below. The compressive strength and elasticity of the grooved insulation board 10 can provide sufficient strength to allow the grooved insulation board 10 to bend without substantially compressing the foam material, thus ensuring that the insulation value R and thermal performance of the grooved insulation board 10 is not reduced during bending. It will be appreciated that a small amount of compression may occur in the grooved insulation board 10 as the board 10 is wrapped around the pipe 12.

In one configuration, the grooved insulation board 10 may be constructed from an extruded polystyrene foam (XPS). In another configuration, the grooved insulation board 10 may be constructed from an expanded polystyrene (EPS) bead foam material. It will be appreciated however that the grooved insulation board 10 may be constructed from other closed cell foam materials, including other polymeric foam materials, within the scope of the present disclosure. By way of example only, the grooved insulation board 10 may be constructed from a foam material formed from polyurethane, polyisocyanurate, polyethylene, polyethylene terephthalate, polypropylene extruded polyester teraphalate (PET), or polyethylene.

It will also be appreciated that the type of material used to construct the grooved insulation board 10 may depend on the desired temperature characteristics of the pipe 12 and the fluid 16 being transported therethrough. In one configuration, extruded PET foam may be used to construct the grooved insulation board 10 in applications requiring higher temperature characteristics in the pipe 12 and the fluid 16. For example, extruded PET foam may be used in applications requiring a temperature of the fluid 16 and the pipe 12 to be maintained at a value greater than or equal to four hundred degrees Fahrenheit (400° F.), such as in power and utility applications and high temperature process equipment in the chemical and petrochemical industries.

Figure 2A:
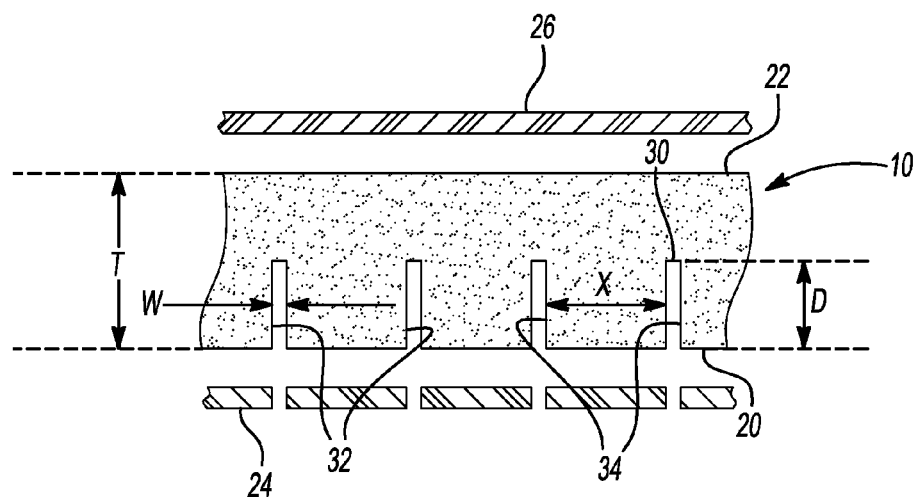
FIG. 2A is an exploded view of the grooved insulation board of FIG. 1, illustrating a grooved pipe-engaging surface in a first position.
Figure 3:
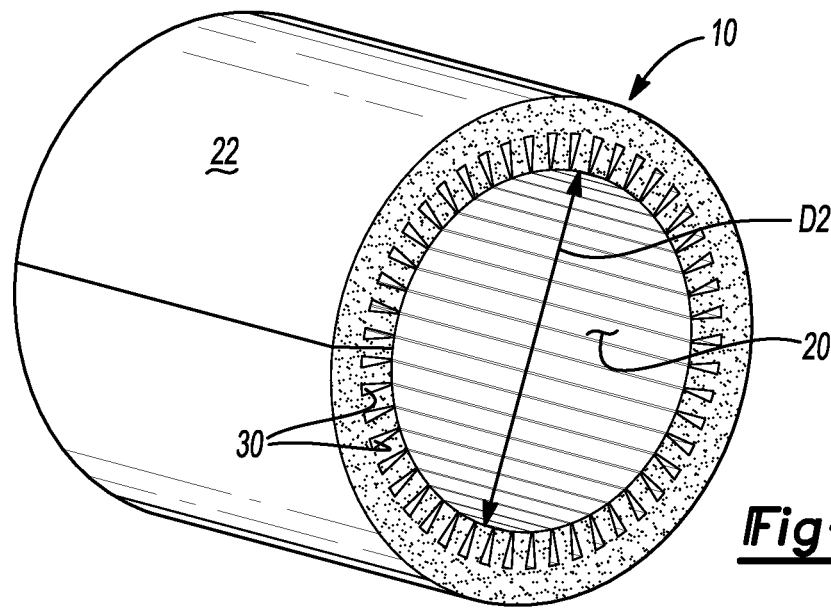
FIG. 3 is a perspective view of the grooved insulation board of FIG. 2A, illustrating the grooved pipe-engaging surface in a second position.

As shown in FIGS. 1, 2A and 3, the grooved insulation board 10 may have a substantially rectangular cross section extending along a second axis 18. The grooved insulation board 10 may have a thickness T extending between a first surface 20 and a second surface 22. As such, the first surface 20 may be substantially parallel to the second surface 22. In one configuration, the first surface 20 may be an inner or pipe-engaging surface, and the second surface 22 may be an external or outer surface. While the thickness T is discussed herein as being less than or equal to four inches, it will be appreciated that the thickness T may be greater than four inches within the scope of the present disclosure.

As illustrated in FIG. 2A, the grooved insulation board 10 may also include a first skin element 24 and a second skin element 26. The first skin element 24 may be adjacent to, and integrally formed with, the first surface 20. The second skin element 26 may be adjacent to, and integrally formed with, the second surface 22. In this regard, it will be appreciated that the first skin element 24 may be an inner or pipe-engaging element, and the second skin element 26 may be an outer element. The first and second skin elements 24, 26 may form a vapor barrier to protect the grooved insulation board 10 from moisture or other contaminants in the surrounding environment. While the grooved insulation board 10 is illustrated in FIG. 2A as including the first and second skin elements 24, 26, it will be appreciated that the grooved insulation board 10 may be constructed without the first and second skin elements 24, 26 within the scope of the present disclosure. In this regard, it will be appreciated that grooved insulation board 10 may be a structural insulation material constructed from a closed cell foam material (e.g., XPS) having inherent vapor and contaminant barrier properties, low water absorption properties, and high structural strength and rigidity properties.

The grooved insulation board 10 may include a plurality of grooves 30 formed in the first surface 20. In this regard, it will be appreciated that in configurations in which the grooved insulation board 10 includes the first skin element 24, as described above, the grooves 30 may also extend through the first skin element 24. As illustrated in FIG. 2A, the grooves 30 may extend in a direction substantially parallel to each other and parallel to the second axis 18 of the grooved insulation board 10. In this regard, it will be appreciated that if the grooved insulation board 10 is formed by an extrusion process, the grooves 30 may be formed in direction extending substantially parallel to the direction of extrusion, or in direction extending substantially perpendicular to the direction of extrusion. The grooves 30 may be formed using a knife, router, saw blade, or other similar cutting device known in the art. The formation of grooves 30 in the grooved insulation board 10 can reduce the production of waste material and reduce the production and assembly costs associated with assembling the grooved insulation board 10 to the pipe 12.

In one configuration the grooves 30 may include first and second sidewalls 32, 34 defining a depth D and a width W extending therebetween, such that the first sidewall 32 is substantially parallel to the second sidewall 34. The depth D may extend in a direction substantially perpendicular to the second axis 18. The width W may extend in a direction substantially perpendicular to the second axis 18 and to the depth D. In one configuration, the width W may be substantially equal to one-tenth (0.10) of an inch. It will also be appreciated that the width W may be less than or greater than one-tenth (0.1) of an inch within the scope of the present disclosure. In this regard, it will be appreciated that the width W may be substantially equal to a width of the cutting device. In one configuration, the grooves 30 may be formed using a circular saw having a sixty-four toothed finishing blade, which can help to ensure accurate placement of the grooves 30, a smooth finish to the first and second sidewalls 32, 34, and uniformity of the width W.

Figure 2B:
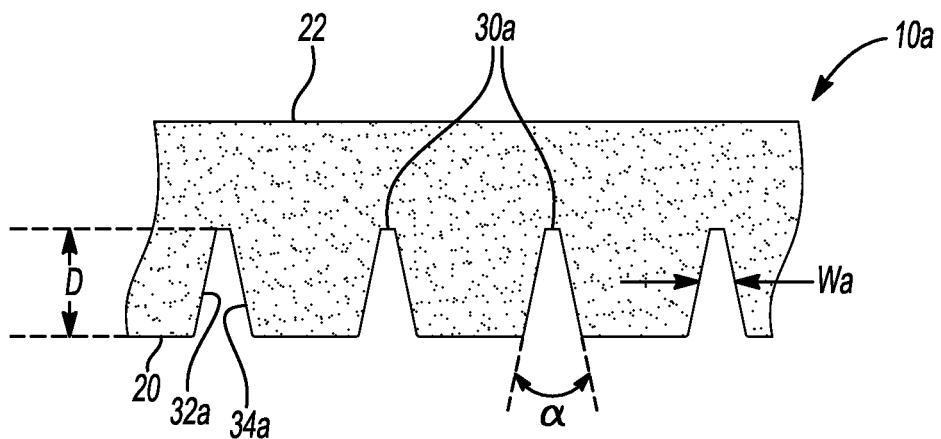
FIG. 2B is a side view of another configuration of a grooved insulation board in accordance with the teaching of the present disclosure.

With reference to FIG. 2B another configuration of a grooved insulation board 10a is shown. The structure and function of the grooved insulation board 10a may be substantially identical to that of the grooved insulation board 10. Accordingly, like reference numerals are used hereinafter and in the drawings to identify like components, while like reference numerals containing letter extensions are used to identify those components that have been modified. The grooved insulation board 10a may include grooves 30a. The grooves 30a may include first and second sidewalls 32a, 34a defining a width Wa extending therebetween. The value of the width Wa may vary or change in a direction extending substantially perpendicular to the second axis 18. Stated differently, the value of the width W may vary along the depth D of the grooves 30a, such that the first and second sidewalls 32a, 34a define an angle α therebetween. The angle α may be less than ten degrees (10°).

The depth D of the grooves 30, and a distance X between consecutive grooves 30, may vary depending, amongst other factors, on the thickness T of the grooved insulation board 10, the material from which the grooved insulation board 10 is formed, and the diameter D1 of the pipe 12 that is wrapped by the grooved insulation board. In one configuration, the depth D of the grooves 30 may be less than or equal to seventy-five percent of the thickness T of the grooved insulation board 10. More preferably, the depth D of the grooves 30 may be less than or equal to fifty percent of the thickness T of the grooved insulation board 10. The distance X may be between one-quarter of an inch and three inches.

Table 1 illustrates the relationship between the diameter D1 of the pipe 12, the distance X between consecutive grooves 30, the thickness T of the grooved insulation board 10, and the depth D of the grooves 30. The example provided in Table 1 includes a grooved insulation board 10 that is formed from XPS foam and includes grooves 30 defining a width W equal to one-tenth (0.10) of an inch.

TABLE 1

|  | Diameter D1 (inches) | |
| --- | --- | --- |
| Distance X (inches) | T (1.0 inch) D (0.5 inch) | T (2.0 inches) D (1.0 inch) |
| 0.50 | 5 | 12 |
| 0.75 | 8 | 21 |
| 1.00 | 11 | 30 |
| 1.25 | 13 | 36 |
| 1.50 | 16 | 44 |

Table 2 illustrates the relationship between the diameter D1 of the pipe 12, the distance X between consecutive grooves 30, the thickness T of the grooved insulation board 10, and the depth D of the grooves 30. The example provided in Table 2 includes a grooved insulation board 10 that is formed from EPS foam and includes grooves 30 defining a width W equal to one-tenth (0.10) of an inch.

TABLE 2

|  | Diameter D1 (inches) | |
| --- | --- | --- |
| Distance X (inches) | T (1.375 inches) D (0.6875 inches) | T (2.0 inches) D (1.0 inch) |
| 0.50 | 8 |  |
| 0.75 | 11 | 19 |
| 1.00 | 16 | 25 |
| 1.25 | 22 | 31 |
| 1.50 | 36 | 41 |

Table 3 illustrates an acceptable range for the depth D given various thicknesses T and a width W equal to one-tenth (0.10) of an inch. The example provided in Table 3 includes a grooved insulation board 10 that is formed from XPS foam. For a grooved insulation board 10 having a thickness T equal to 1.0 inch, an optimum depth D may be between 0.375 inch and 0.50 inch. For a grooved insulation board 10 having a thickness T equal to 2.0 inches, an optimum depth D may be between 1.0 inch and 1.25 inches. For a grooved insulation board 10 having a thickness T equal to 3.0 inches, an optimum depth D may be between 2.0 inches and 2.25 inches. For a grooved insulation board 10 having a thickness T equal to 4.0 inches, an optimum depth D may be between 2.75 inches and 3.00 inches.

TABLE 3

| Thickness T (inches) | Depth D | Depth D |
|---|---|---|
| 1 | 0.375 | 0.50 |
| 2 | 1.00 | 1.25 |
| 3 | 2.00 | 2.25 |
| 4 | 2.75 | 3.00 |

Table 4 illustrates an acceptable range of depths D given various thicknesses T and a width W equal to one-tenth (0.10) of an inch. The example provided in Table 4 includes a grooved insulation board 10 that is formed from EPS foam. For a grooved insulation board 10 having a thickness T equal to 1.375 inches, an optimum depth D may be substantially equal to 0.6875 inch. For a grooved insulation board 10 having a thickness T equal to 2.0 inches, an optimum depth D may be between 1.125 inches and 1.25 inches.

TABLE 4

| Thickness T (inches) | Depth D | Depth D |
|---|---|---|
| 1.375 | 0.50 | 0.875 |
| 2 | 1.00 | 1.25 |

A method of assembling the grooved insulation board 10 and the pipe 12 may include forming a plurality of grooves 30 in the first surface 20 of the grooved insulation board 10. The grooves 30 may be formed in the first surface 20 while the grooved insulation board 10 is in a first position (FIGS. 2A and 2B). The grooved insulation board 10 may then be wrapped or otherwise configured into a second position (FIGS. 1 and 3), defining a cylindrical shape. It will be appreciated that the grooved insulation board 10 may be configured into the second position by wrapping the grooved insulation board 10 around the exterior surface 14 of the pipe 12, such that the first surface 20 is adjacent to, and facing, the exterior surface 14. In this regard, the grooved insulation board 10 may define a second diameter D2 that is substantially equal to, but slightly greater than, the first diameter D1 of the pipe 12. In the second position, the first axis 13 of the pipe 12 is substantially parallel to the second axis 18 of the grooved insulation board 10. The grooved insulation board 10 may be secured in the second position using adhesive, mechanical fasteners, or other suitable securing technique known to those having skill in the art. In one method of securing the grooved insulation board 10 in the second position, heat may be applied to the grooved insulation board 10, such that the grooved insulation board 10 is thermoformed into the second position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An insulated assembly comprising:
a pipe having a cylindrical outer surface defining a first diameter,
a substantially rigid, grooved insulation board wrapped around the outer surface of the pipe, the insulation board having an outer surface and an inner surface, the inner surface defining a second diameter, the second diameter substantially equal to the first diameter, the inner surface immediately adjacent the cylindrical outer surface of the pipe and including a plurality of grooves open to the inner surface, each of the plurality of grooves including first and second opposed sidewalls, the insulation board consisting of a foam material extending from the outer surface to the inner surface, wherein the first and second opposed sidewalls of each groove of the plurality of grooves are parallel, and wherein the grooved insulation board has compressive strength and elasticity to wrap around the pipe without substantially compressing the foam material and thereby maintanining an insulation vaule R and a thermal performance of the grooved insulation board after wrapping.

2. The insulated assembly of claim 1, wherein the insulation board defines a thickness, and wherein each of the plurality of grooves defines a depth that is less than or equal to seventy-five percent of the thickness.

3. The insulated assembly of claim 2, wherein the depth is less than or equal to fifty percent of the thickness.

4. The insulated assembly of claim 1, wherein the insulation board when wrapped about the pipe defines a closed inner diameter surrounding the pipe and axially extending openings having a triangular shape in a radial direction.

5. The insulated assembly of claim 1, wherein the insulation board includes a material having a compressive strength and a flexural strength, the compressive strength having a value between fifteen pounds per square inch and one hundred pounds per square inch, and the flexural strength having a value between forty pounds per square inch and one hundred pounds per square inch.

6. An insulated pipe comprising:
a pipe having a cylindrical outer surface defining a first diameter,
a substantially rigid, grooved insulation board having a first surface, a second surface opposing the first surface, and plurality of grooves formed in the second surface, each groove of the plurality of grooves defined by parallel first and second sidewalls wherein the insulation board consisting of a material selected from a group consisting of polystyrene, polyurethane, polyisocyanurate, polyethylene, polyethylene terephthalate, polypropylene, the material extending from the first surface to the second surface,
wherein the insulation board defines a thickness, and each of the plurality of grooves defines a depth that is less than or equal to seventy-five percent of the thickness,
wherein the second surface of the insulation board is immediately adjacent the cylindrical outer surface of the pipe, and
wherein the grooved insulation board has compressive strength and elasticity to wrap around the pipe without substantially compressing the foam material and thereby maintaining an insulation value R and thermal performance of the grooved insulation board after wrapping.

7. The insulated pipe of claim 6, wherein the insulation board is formed of a material selected from a group consisting of expanded polystyrene and extruded polystyrene.

8. The insulated pipe of claim 6, wherein the depth D is less than or equal to fifty percent of the thickness T.

9. The insulated pipe of claim 6, wherein the insulation board when wrapped about the pipe defines a closed inner diameter surrounding the pipe and axially extending openings having a triangular shape in a radial direction.

10. A method of insulating a pipe, the method comprising:
providing a metal pipe having a cylindrical outer surface, the outer surface defining a first diameter;
providing a substantially rigid insulation board having a first surface and a second surface opposing the first surface;
forming a plurality of grooves in the second surface of the rigid insulation board such that each groove of the plurality of grooves includes first and second parallel sidewalls and thereby form a grooved insulation board;
wrapping the substantially rigid insulation board around the pipe such that the second surface is positioned immediately adjacent the cylindrical outer surface of the pipe and the second surface defines a second diameter substantially equal to the first diameter; and
heating the rigid insulation board such that the second surface maintains the second diameter,
wherein the grooved insulation board has compressive strength and elasticity to wrap around the pipe without substantially compressing the foam material and thereby maintaining an insulation vaule R and thermal performance of the grooved insulation board after wrapping.

11. The method of claim 10, wherein the insulation board is formed of a material selected from a group consisting of expanded polystyrene and extruded polystyrene.

12. The method of claim 11, further comprising forming the insulation board by an extrusion process.

13. The method of claim 11, further comprising forming the insulation board by an expansion process.

14. The method of claim 10, wherein the insulation board defines a thickness, and wherein each of the plurality of grooves is formed to define a depth that is less than or equal to seventy-five percent of the thickness.

15. The method of claim 14, wherein the depth is less than or equal to fifty percent of the thickness.

16. The method of claim 10, wherein wrapping the substantially rigid insulation board around the pipe includes closing an inner diameter of the insulation board around the pipe to continuously surround the pipe and defining axially extending openings in the insulation board, each having a triangular shape in a radial direction.

17. An insulation board constructed of a foam material, the insulation board defining a thickness and including a plurality of parallel grooves defining a depth and a distance therebetween, wherein the depth is less than or equal to seventy-five percent of the thickness, and the distance is between one-quarter of an inch and three inches, such that the insulation board can be bent to contact an outer surface of a cylindrical pipe.

18. The insulation board of claim 17, wherein the foam material is selected from a group consisting of an expanded polystyrene bead foam, an extruded polyethylene terephthalate foam, a rigid polyurethane foam, an expanded polyethylene terephthalate foam, an extruded polyethylene foam, an extruded polypropylene foam, expanded polyethylene foam, and an expanded polypropylene foam.

19. The insulation board of claim 18, wherein the foam material includes a plurality of cells having a transverse dimension between 0.10 and 0.35 millimeters.

* * * * *